United States Patent [19]

Higginbotham et al.

[11] Patent Number: 5,896,575

[45] Date of Patent: Apr. 20, 1999

[54] ELECTRONIC DEVICE WITH DISPLAY VIEWABLE FROM TWO OPPOSITE ENDS

[75] Inventors: Sandra Gonzalez Higginbotham, Keller; Nickolaos Pete Lagen, Fort Worth; David Richard Becker, Keller, all of Tex.

[73] Assignee: Motorola, Inc., Schaumburg, Ill.

[21] Appl. No.: 08/808,332

[22] Filed: Feb. 28, 1997

[51] Int. Cl.$^6$ .................. H04Q 7/00; H04Q 7/32
[52] U.S. Cl. .............. 455/566; 455/556; 455/557; 455/575
[58] Field of Search .................. 455/344, 566, 455/556, 557, 550, 553, 572, 574, 575, 347, 351, 158.4; 364/707, 708; 345/126, 431, 437, 121, 49, 52, 56

[56] References Cited

U.S. PATENT DOCUMENTS

| | | | |
|---|---|---|---|
| 4,817,194 | 3/1989 | Andros, Jr. .................. | 455/158.4 |
| 5,014,046 | 5/1991 | Minami .................. | 345/121 |
| 5,189,632 | 2/1993 | Paajanen et al. .................. | 455/556 |
| 5,268,816 | 12/1993 | Abell, Jr. et al. .................. | 364/708 |
| 5,353,075 | 10/1994 | Conner et al. .................. | 364/708 |
| 5,508,720 | 4/1996 | DiSanto et al. .................. | 345/49 |
| 5,522,089 | 5/1996 | Kikinis et al. .................. | 455/556 |

*Primary Examiner*—Edward F. Urban
*Assistant Examiner*—Keith Ferguson
*Attorney, Agent, or Firm*—R. Louis Breeden

[57] ABSTRACT

An electronic device (100) includes a processor (808) for processing a message (110), and a display (114) electrically coupled to the processor for displaying an image including the message. The display is constructed and arranged such that the image is viewable from first and second sides (116, 118) of the display, the first and second sides facing opposite one another.

14 Claims, 4 Drawing Sheets

300

300

*500*

*100*

ELECTRONIC DEVICE WITH DISPLAY VIEWABLE FROM TWO OPPOSITE ENDS

Field of the Invention

This invention relates in general to electronic devices, and more specifically to an electronic device having a display that is viewable from two opposite sides.

BACKGROUND OF THE INVENTION

Modern radio messaging systems capable of transmitting alphanumeric messages and other images have brought about a need for increased display space. In addition the advent of two-way messaging has created a need for more keypad space, including enough space to accommodate a full alphanumeric keypad with which an inbound message can be entered. On the other hand, a desire for smaller portable messaging devices tends to limit the space available for both the display and the keypad.

Another consideration affecting particularly the display is that different users have different preferences concerning how they want to use a portable messaging device. Some users prefer to carry the device in a clothing pocket. Others prefer to wear the device on a belt. Others prefer to carry the device in a handbag or briefcase. Still others prefer to leave the device on a desktop. And, of course, all users want the device to use very little battery power, so that the battery life is long.

Thus, what is needed is a portable messaging device (or other electronic device) that can have both a large display and a full alphanumeric keypad without causing the device to grow undesirably large. In addition, the display preferably should be adjustable to accommodate a variety of usage preferences and should use very little battery power.

SUMMARY OF THE INVENTION

An aspect of the present invention is a portable radio messaging device. The device comprises an antenna for intercepting a message, and a receiver coupled to the antenna for demodulating the message. The device further comprises a processor coupled to the receiver for processing the message, and a display electrically coupled to the processor for displaying an image including the message. The display is constructed and arranged such that the image is viewable from first and second sides of the display, the first and second sides facing opposite one another.

Another aspect of the present invention is an electronic device. The device comprises a processor for processing a message, and a display electrically coupled to the processor for displaying an image including the message. The display is constructed and arranged such that the image is viewable from first and second sides of the display, the first and second sides facing opposite one another.

DETAILED DESCRIPTION OF THE DRAWINGS

Figure 1:
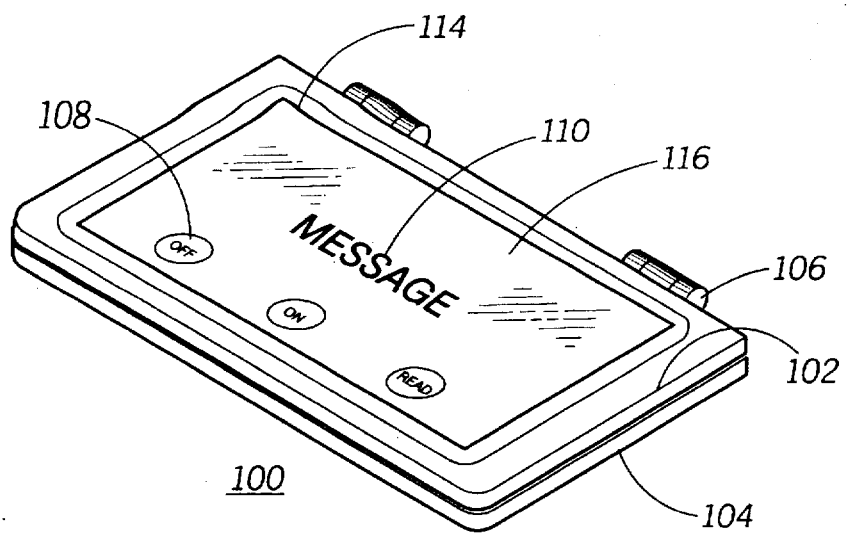
FIG. 1 is an isometric drawing of a portable radio messaging device having its display in a first position in accordance with the present invention.

FIG. 1 is an isometric drawing of a portable radio messaging device 100 having its display 114 in a first (closed) position in accordance with the present invention. The device 100 comprises a display portion 102 and a base portion 104. The display portion 102 and the base portion 104 are rotatably coupled at a common edge by a hinge 106. The display further comprises a first side 116 and a second side 118 (FIG. 2) facing in opposite directions. Both sides 116, 118 are usable for viewing information displayed on the display 114. The display 114 also preferably comprises a conventional touchscreen 108 on the first side 116 for providing user control of the device 100 while the display portion 102 is in a closed position, as depicted in FIG. 1. Note also that a message 110 is readable on the display 114 in the closed position.

Figure 2:
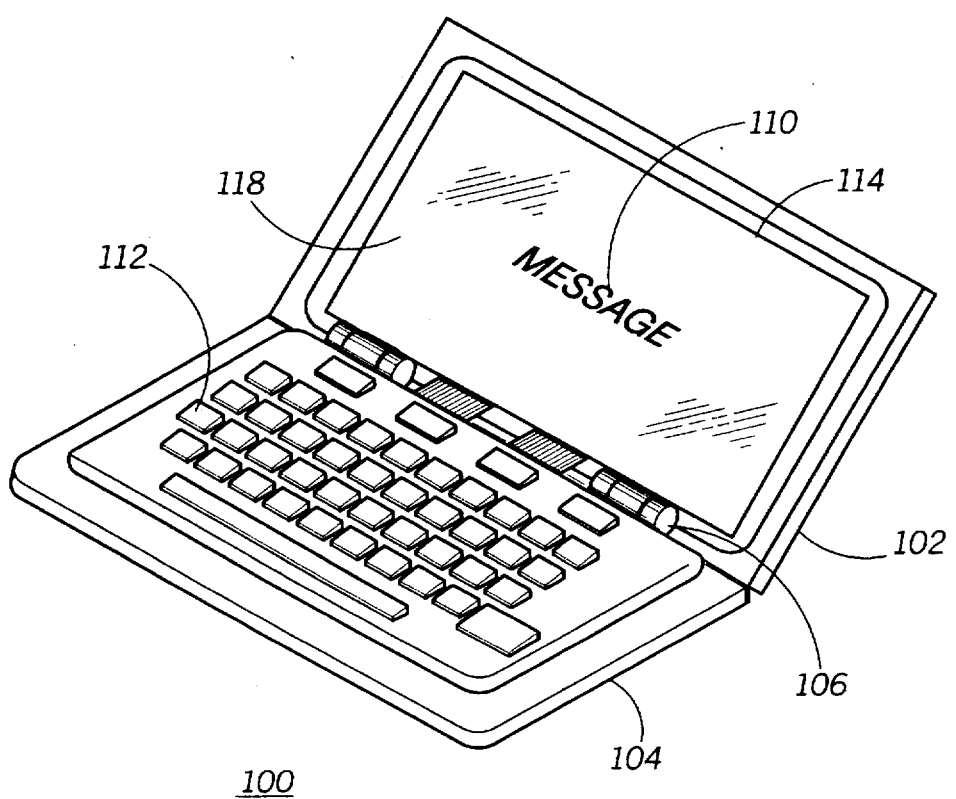
FIG. 2 is an isometric drawing of the portable radio messaging device having its display in a second position in accordance with the present invention.

FIG. 2 is an isometric drawing of the portable radio messaging device 100 having its display 114 in a second (open) position in accordance with the present invention. Preferably, the display 114 is transparent except for a layer forming the active pixel elements of the display, so that the displayed image is visible from either side of the display 114. Note also that the message 110 has been flipped vertically in order to maintain a correct orientation of the image. Preferably the vertical flipping is performed automatically in response to the display 114 being moved from the first (closed) position to the second (open) position, as described further below. When in the open position, a keypad 112 is revealed for composing locally entered messages. As the keypad 112 can include additional user controls for controlling the device 100, preferably no touchscreen is included on the inner surface of the display 114. It will be appreciated that, alternatively, a touchscreen can be provided on the second side 118 of the display 114 as well. It will be further appreciated that the keypad 112 can be constructed of any suitable type of alphanumeric entry device, including a membrane pad, a touch pad, a touch screen, a mechanical key switch, and a silicone pad, to name a few types.

Figure 3:
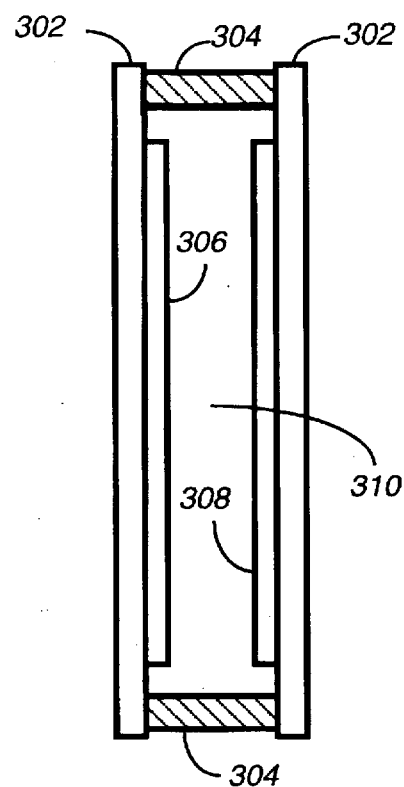
FIG. 3 is a side view of the preferred embodiment of the display in accordance with the present invention.

FIG. 3 is a side view of the preferred embodiment 300 of the display 114 in accordance with the present invention. The preferred embodiment 300 comprises two transparent, rigid outer seals 302, preferably constructed of glass. Plastic spacers 304 maintain separation of the outer seals 302. A matrix of transparent display electrodes 306 and a transparent counter electrode 308 are formed by plating a transparent, conductive material, such as tin oxide, onto the inner surfaces of the seals. An electrochemical material 310, e.g., polyaniline, is disposed between the display electrodes 306 and the counter electrode 310. It will be appreciated that, alternatively, other suitable materials can be utilized as well for the outer seals 302, display electrodes 306, counter electrode 308, and electrochemical material 310.

The structure described above for the preferred embodiment 300 includes both electrochromic and electrochromatic displays, the former being monochromatic and the latter capable of multi-colored display. Both the electrochromic display and the electrochromatic display are well known in the art. Alternatively, and less advantageously, conventional liquid crystal display (LCD) technology can be used as well. Electrochromic and electrochromatic display technologies provide several advantages that are important for applications such as the portable radio messaging device 100. One important advantage is that the preferred embodiment 300 requires power only for writing or erasing an image. Once an image has been written onto the preferred embodiment 300, no power is required to retain the image on the display. This characteristic of electrochemical displays can have a substantial beneficial effect on battery life of the portable radio messaging device 100. Another important advantage is the ability to construct a transparent display. For example, the pixels of the message can be rendered black (or some other color), while the remaining pixels can be changed to a contrasting color (or made transparent). Because the display is transparent except for the active portion comprising the electrochemical material forming the image and background, both sides of the display advantageously can be used for displaying the image and background, as described briefly herein above. A transparent display, combined with the touchscreen 108, provides the advantage of viewing a single image, such as a message, from either side of the display 114 and of being able to operate the device 100 without having to open the display portion 102.

Figure 4:
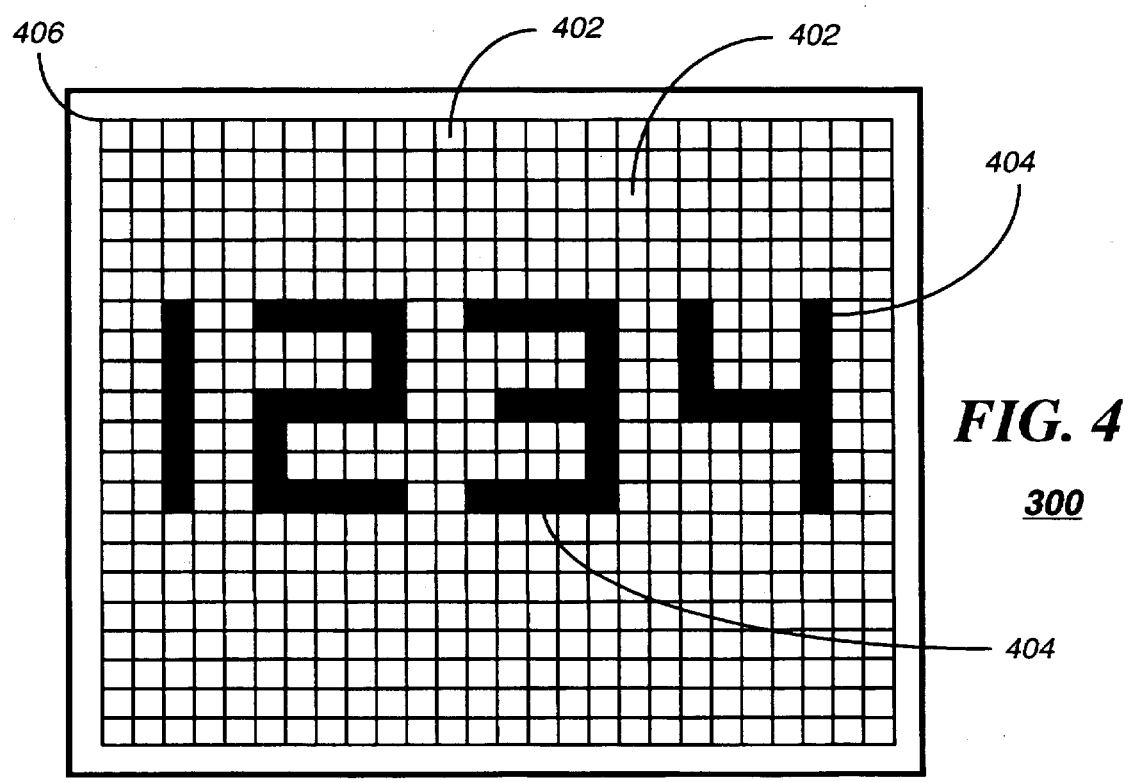
FIG. 4 is a front view of a portion of the preferred embodiment of the display in accordance with the present invention.

FIG. 4 is a front view of a portion of the preferred embodiment 300 of the display in accordance with the present invention. FIG. 4 depicts a field of pixels 406 for displaying an image. The image is displayed by rendering the image pixels 404 a first color, e.g., black, and rendering the background pixels 402 a second, contrasting color, e.g., yellow. Because the outer seals 302 of the preferred embodiment 300 are transparent, the image pixels 404 and the background pixels 402 can be seen from either side of the display 114.

Figure 5:
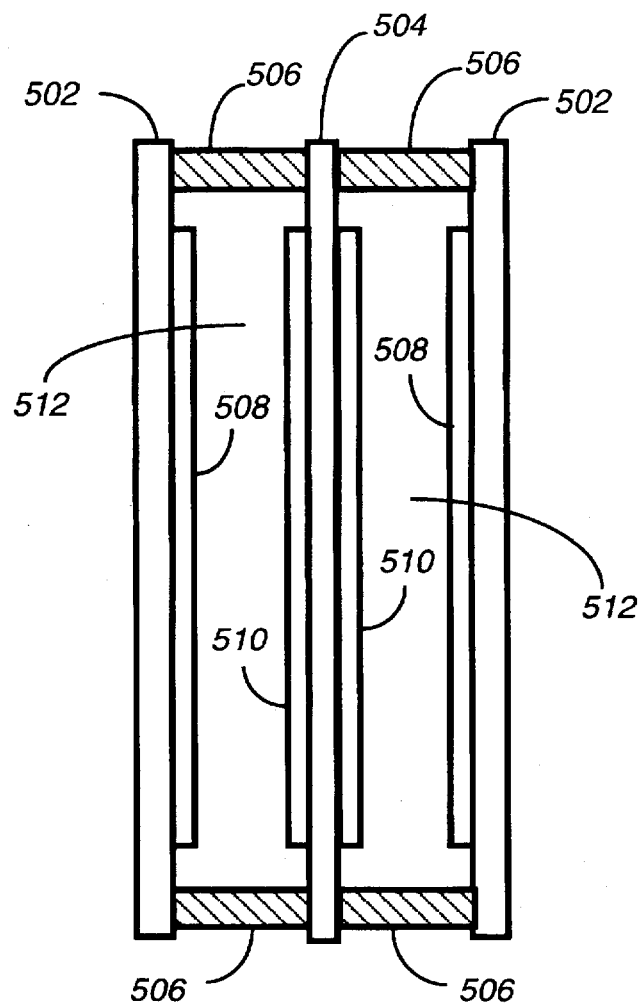
FIG. 5 is a side view of an alternative embodiment of the display in accordance with the present invention.

FIG. 5 is a side view of an alternative embodiment 500 of the display 114 in accordance with the present invention. The alternative embodiment 500 comprises two transparent, rigid outer seals 502, preferably constructed of glass. A rigid inner substrate 504 is supported between the two outer seals 502 and comprises two reflective counter electrodes 510 on either side. The reflective counter electrodes 510 comprise a conductive, reflective material, such as gold. Two matrices of transparent display electrodes 508 are formed onto the inner surfaces of the outer seals 502. An electrochemical material 512 is disposed between the display electrodes 508 and the reflective counter electrodes 510. The structure of the alternative embodiment 500 also lends itself to electrochromic, electrochromatic, and LCD technologies. The alternative embodiment 500 offers the capability of displaying either the same or two different images on the two sides of the display 114. Disadvantages of the alternative embodiment 500, however, include higher cost and greater thickness than the preferred embodiment 300.

Figure 6:
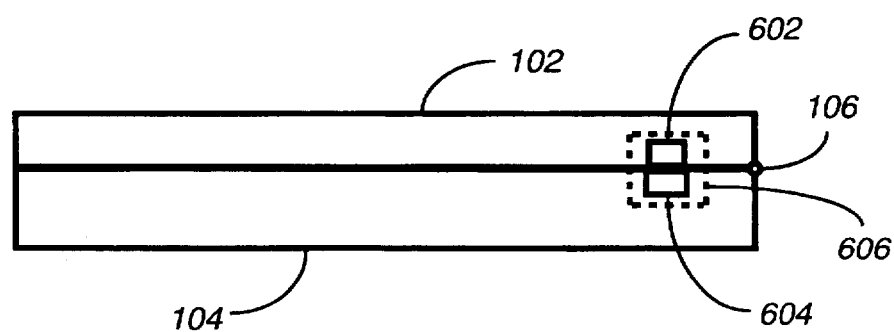
FIG. 6 is a side view of the portable radio messaging device depicting a display position detector with the display positioned in the first position in accordance with the present invention.
Figure 8:
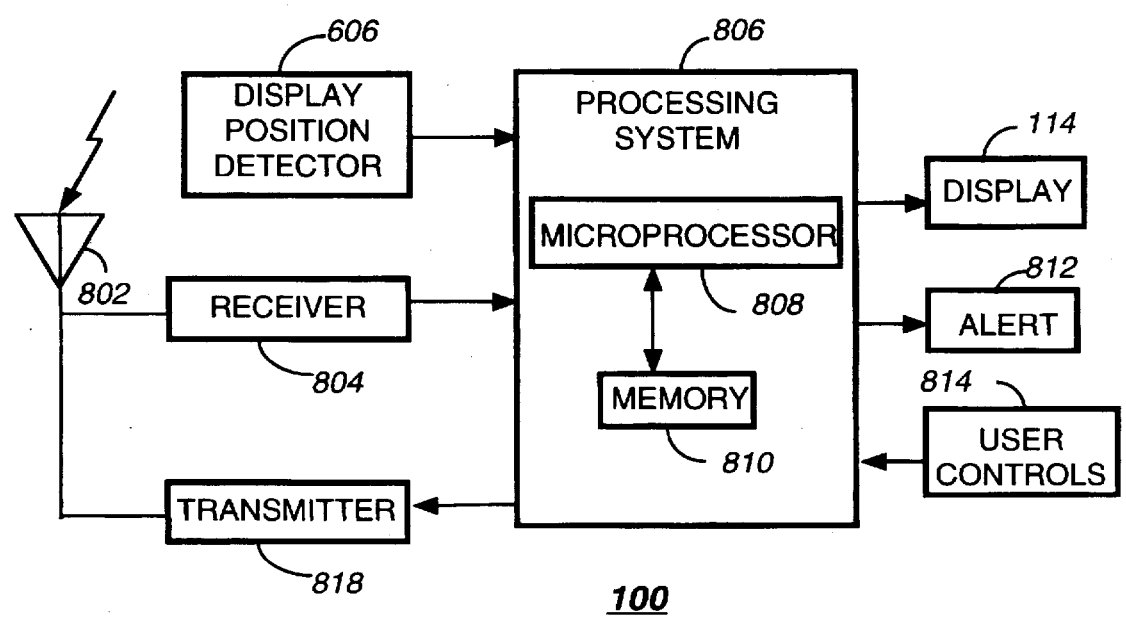
FIG. 8 is an electrical block diagram of the portable radio messaging device in accordance with the present invention.

FIG. 6 is a side view of the portable radio messaging device 100 depicting a display position detector 606 with the display portion 102 of the portable radio messaging device 100 positioned in the first (closed) position in accordance with the present invention. The display position detector 606 preferably comprises a permanent magnet 602 and a conventional magnetic reed switch 604 coupled to the processing system 806 (FIG. 8). When the display portion 102 is in the first (closed) position, the permanent magnet 602 is proximate the magnetic reed switch 604, and the magnetic reed switch 604 assumes an operative state which indicates to the processing system 806 that the display portion 102 is in the first (closed) position.

Figure 7:
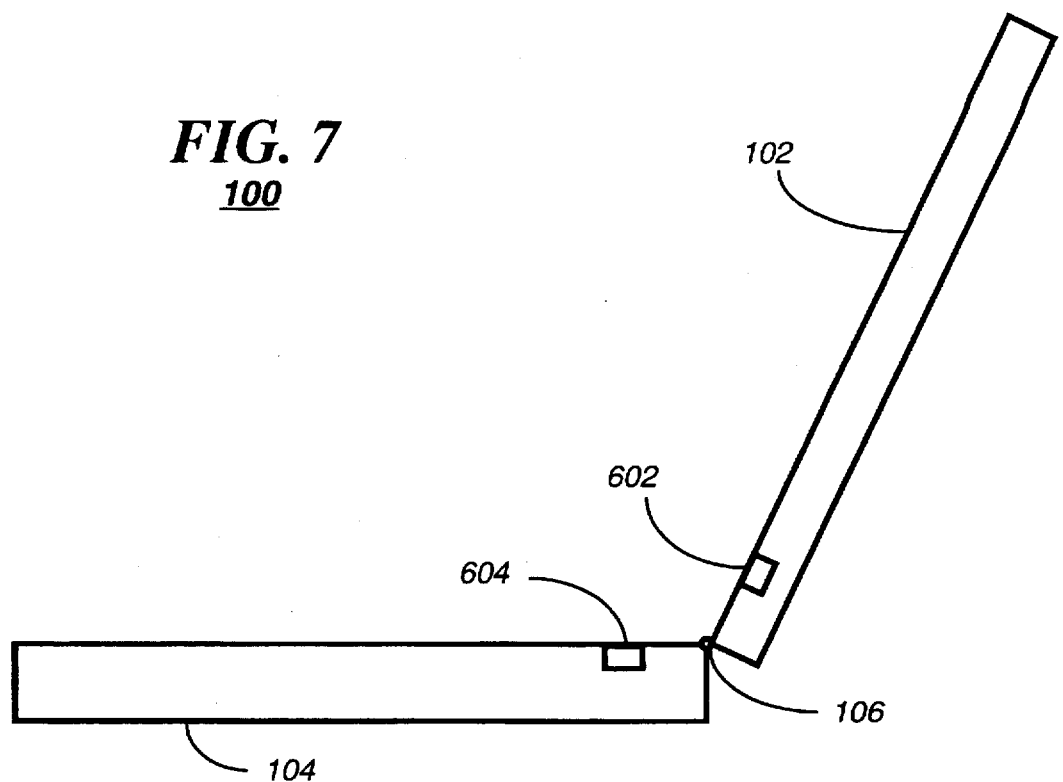
FIG. 7 is a side view of the portable radio messaging device depicting the display position detector with the display positioned in the second position in accordance with the present invention.

FIG. 7 is a side view of the portable radio messaging device 100 depicting the display position detector 606 with the display portion 102 positioned in the second (open) position in accordance with the present invention. When the display portion 102 is in the second (open) position, the permanent magnet 602 is remote from the magnetic reed switch 604, and the magnetic reed switch 604 assumes a state which indicates to the processing system 806 that the display portion 102 is in the second (open) position. It will be appreciated that, alternatively, many other methods and apparatus, e.g., a cam-operated microswitch or a photoelectric means, can be utilized to implement the display position detector 606 as well.

FIG. 8 is an electrical block diagram of the portable radio messaging device 100 in accordance with the present invention. The device 100 comprises an antenna 802 for intercepting radio signals comprising messages and for emitting radio signals in response to the messages. The antenna 802 is coupled to a conventional receiver 804 for demodulating the messages. The antenna 802 is further coupled to a conventional transmitter 818 for transmitting responses. The transmitter 818 and the receiver 804 are coupled to a processing system 806 for control thereby. The processing system 806 comprises a conventional microprocessor 808 coupled to a conventional memory 810 comprising software for programming the processing system 806 in accordance with the present invention. The processing system 806 is coupled to the display position detector 606 for detecting the position of the display portion 102 with respect to the base portion 104. The processing system 806 is also coupled to the display 114 for controlling the display 114 in accordance with the present invention. The microprocessor 808 and the display position detector 606 cooperate to flip the displayed image in order to maintain a correct orientation of the image, in response to the display portion 102 being moved from the first (closed) position to the second (open) position.

The display 114 is preferably an electrochemical display of the electrochromic or electrochromatic type, and the microprocessor 808 and the display 114 are arranged such that after an image is displayed on the display 114, power is removed from the display 114 without erasing the image. For the preferred electrochromic display, the microprocessor 808 and the display 114 are arranged such that custom text colors and logos are programmed within the microprocessor 808 (or, alternatively, within the memory 810) and displayed on the display 114. The microprocessor 808 and the display position detector 606 further cooperate to place the portable radio messaging device 100 into a local message entry mode in response to the display portion 102 being moved to the second (open) position. The processing system 806 is further coupled to a conventional alert element 812 for generating an audible, visible, or tactile alert. In addition, the processing system 806 is coupled to user controls 814 for providing control by a user. The user controls preferably comprise the touchscreen 108 and the keypad 112.

It should now be apparent that the present invention advantageously provides an electronic device that has both a large display and a full alphanumeric keypad without causing the device to be undesirably large. In addition, the display is viewable from both sides, thereby allowing a wide range of adjustment to accommodate a variety of usage preferences. In addition, the present invention advantageously conserves battery power.

While the foregoing has disclosed by way of example an embodiment in accordance with the present invention, it will be appreciated that many alternative embodiments in accordance with the present invention may occur to one of ordinary skill in the art, given the teachings of this disclosure. For example, the display apparatus and techniques disclosed herein can be advantageously applied to many other types of electronic devices in addition to portable radio messaging devices. Consequently, the scope of the invention is delimited only according to the following claims.

What is claimed is:

1. A wireless messaging device, comprising:

a receiver for receiving a message;

a processor coupled to the receiver for processing the message; and a display electrically coupled to the processor for displaying an image including the message, wherein the display is constructed and arranged such that the image is viewable from first and second sides of the display, the first and second sides facing opposite one another, and such that the display is transparent except for an active portion which forms the image, allowing a single image to be seen from either side of the display, and wherein the display is further constructed and arranged such that it can be positioned in a first position in which the first side is visible to a user and in a second position in which the second side is visible to the user, and wherein the wireless messaging device further comprises a display position detector coupled to the display and coupled to the processor for cooperating with the processor to flip the image in order to maintain a correct orientation of the image, in response to the display being moved from the first position to the second position.

2. The wireless messaging device of claim 1, wherein the display comprises a touchscreen on at least one of the first and second sides, the touchscreen coupled to the processor for providing user control of the wireless messaging device.

3. The wireless messaging device of claim 1, wherein the processor and the display are arranged such that after an image is displayed on the display, power is removed from the display without erasing the image.

4. The wireless messaging device of claim 1, wherein the processor and the display are arranged such that custom text colors and logos are programmed within the processor and displayed on the display.

5. The wireless messaging device of claim 1, wherein the display is an electrochromic display.

6. The wireless messaging device of claim 1, wherein the display is an electrochromatic display.

7. The wireless messaging device of claim 1, further comprising a keypad for local message entry by a user, wherein the processor and the display position detector further cooperate to place the wireless messaging device into a local message entry mode in response to the display being moved to the second position.

8. An electronic device, comprising:

a processor for processing a message; and a display electrically coupled to the processor for displaying an image including the message, wherein the display is constructed and arranged such that the image is viewable from first and second sides of the display, the first and second sides facing opposite one another, and such that the display is transparent except for an active portion which forms the image, allowing a single image to be seen from either side of the display, and wherein the display is further constructed and arranged such that it can be positioned in a first position in which the first side is visible to a user and in a second position in which the second side is visible to the user, and wherein the electronic device further comprises a display position detector coupled to the display and coupled to the processor for cooperating with the processor to flip the image in order to maintain a correct orientation of the image, in response to the display being moved from the first position to the second position.

9. The electronic device of claim 8, wherein the display comprises a touchscreen on at least one of the first and second sides, the touchscreen coupled to the processor for providing user control of the electronic device.

10. The electronic device of claim 8, wherein the processor and the display are arranged such that after an image is displayed on the display, power is removed from the display without erasing the image.

11. The electronic device of claim 8, wherein the processor and the display are arranged such that custom text colors and logos are programmed within the processor and displayed on the display.

12. The electronic device of claim 8, wherein the display is an electrochromic display.

13. The electronic device of claim 8, wherein the display is an electrochromatic display.

14. The electronic device of claim 8, further comprising a keypad for local message entry by a user, wherein the processor and the display position detector further cooperate to place the electronic device into a local message entry mode in response to the display being moved to the second position.

* * * * *